July 4, 1950   J. M. KEMPER   2,513,332
CABIN PRESSURE CONTROL SYSTEM
Filed Nov. 18, 1946   2 Sheets-Sheet 2

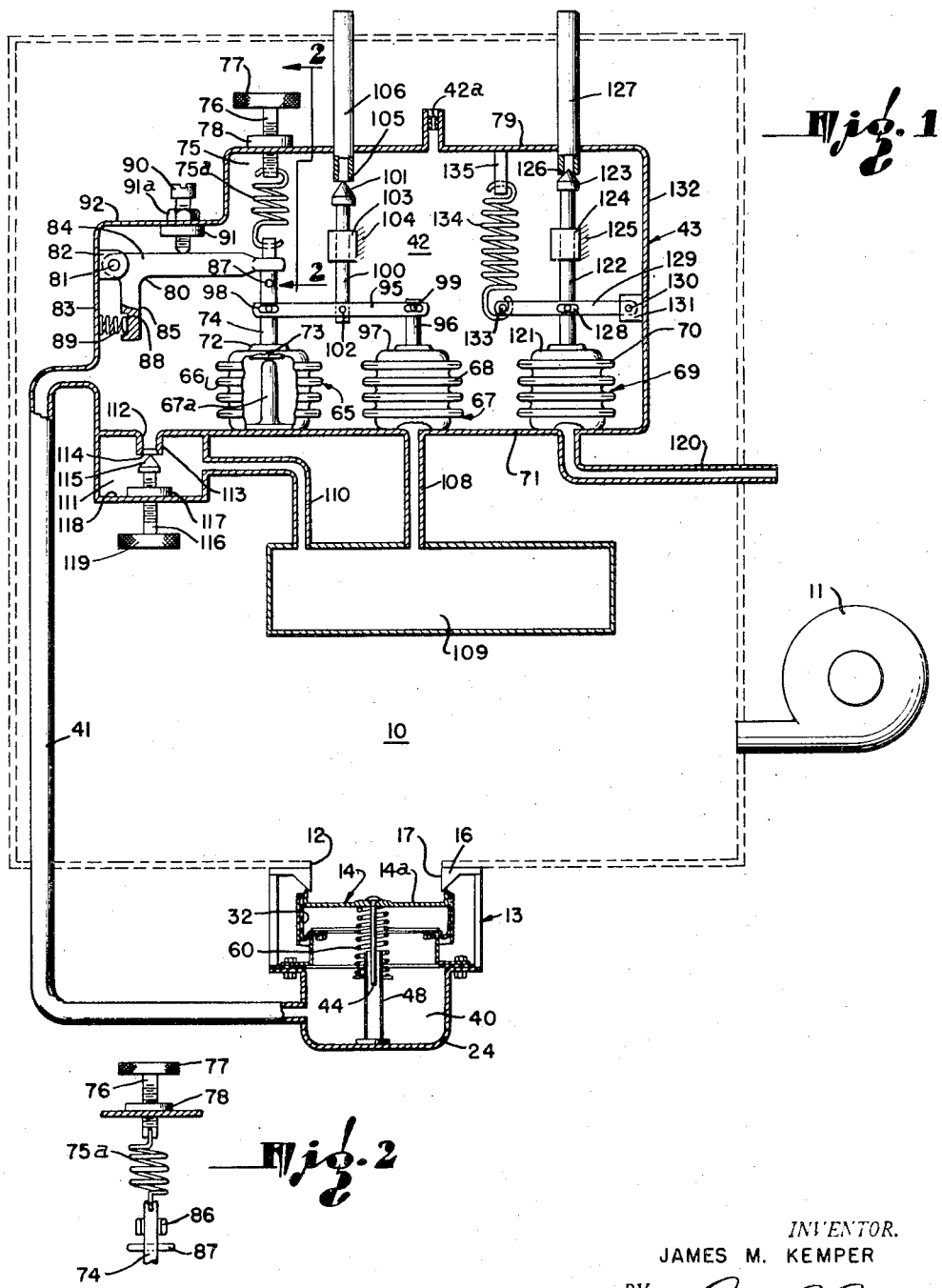

INVENTOR.
JAMES M. KEMPER
BY
ATTORNEY

Patented July 4, 1950

2,513,332

UNITED STATES PATENT OFFICE 2,513,332

CABIN PRESSURE CONTROL SYSTEM

James M. Kemper, Hollywood, Calif., assignor to The Garrett Corporation, Los Angeles, Calif., a corporation of California Application November 18, 1946, Serial No. 710,677

22 Claims. (Cl. 98—1.5)

This invention relates generally to means for controlling the pressurized ventilation of an enclosure, and relates more particularly to means for maintaining a desired air pressure within the enclosure.

While the invention has particular utility in connection with pressurized ventilation of aircraft cabins and the like, and is shown and described embodied in such an installation, it is to be understood that its utility is not confined thereto.

It is sometimes highly desirable to produce a gradual change in the air pressure within an aircraft during its flight from one altitude to another, as from a lower altitude airport to a higher one, or vice versa, and it is therefore an object of the present invention to provide means by which the air pressure within a cabin or enclosure may be automatically changed at a predetermined rate, regardless of the rate of change in ambient atmospheric pressure. Thus discomfort or harm to the occupants of the aircraft is avoided.

It is another object of the present invention to provide means of this character whereby the pressure within an aircraft cabin may be changed at a gradual preselected rate during flight so that it will have reached a value substantially that of the ambient atmospheric pressure at the terminal airport. Thus, upon landing at an airport situated at a higher or lower altitude than at the starting point of the flight, the occupant or occupants of the craft will find the atmospheric pressure at the terminal airport substantially the same as that within the aircraft when it lands at said terminal airport, thus avoiding any sudden and uncomfortable pressure change at said airport when landing and leaving the aircraft.

It is a further object to control the pressure in pressurized cabins in such manner as will permit the selection of a desired pressure within the cabin and also a desired rate of pressure change within the cabin whereby changes in pressure to which occupants of the cabin are subjected will not be so abrupt or rapid as to cause discomfort.

Let it be supposed that an aircraft upon leaving an airport at one altitude is to land at a field of different altitude within a given period of time. The occupants of the cabin are subjected to a pressure change, produced gradually, so that when the second landing field is reached, the pressure to which the occupants are subjected within the aircraft cabin will correspond to the atmospheric pressure at the second landing field. During the flight from the first field to the second field, although the aircraft may rise to an altitude considerably above the altitude of either landing field, the occupants of the pressurized cabin will not be conscious of this fact, but will be subjected to a reduced pressure no greater than that corresponding to the altitude of the highest of the two landing fields.

Another object of the invention is to provide a device of this character wherein the control means is responsive to a control chamber pressure.

Still another object of the invention is to provide a cabin structure protective means or supplementary control which functions to relieve excessive cabin pressure if it should exceed a safe value, based upon the structural characteristics of the cabin.

It is a further object to provide a device of this character that is relatively simple in construction and reliable in operation.

Other objects and advantages of the invention will appear from the following part of the specification.

Referring to the drawings, which are for illustrative purposes only,

Fig. 1 is a diagrammatic view of a control mechanism embodying the present invention;

Fig. 2 is a fragmentary view taken on the line 2—2 of Fig. 1;

Referring to Fig. 1, there is shown a schematic or diagrammatic representation of a cabin pressure control system embodying the present invention. An enclosure or cabin is indicated generally at 10, which is supplied by air under pressure by a supercharger 11, or the like, which may be operated by any suitable source of power, not shown, for maintaining a flow of air through the cabin for purposes of ventilation. The cabin is provided with an outlet opening 12 which is controlled by an outflow valve assembly, indicated generally at 13, although it may be otherwise disposed. The valve 13, as herein shown, is an example of one type which may be used in the present control system and which will directly control cabin pressure. Other types of outflow valves may be used, another example being that disclosed in my copending application for a Cabin Pressure Regulator, Serial No. 556,790, filed October 2, 1944, now Patent No. 2,463,491.

Figure 3:
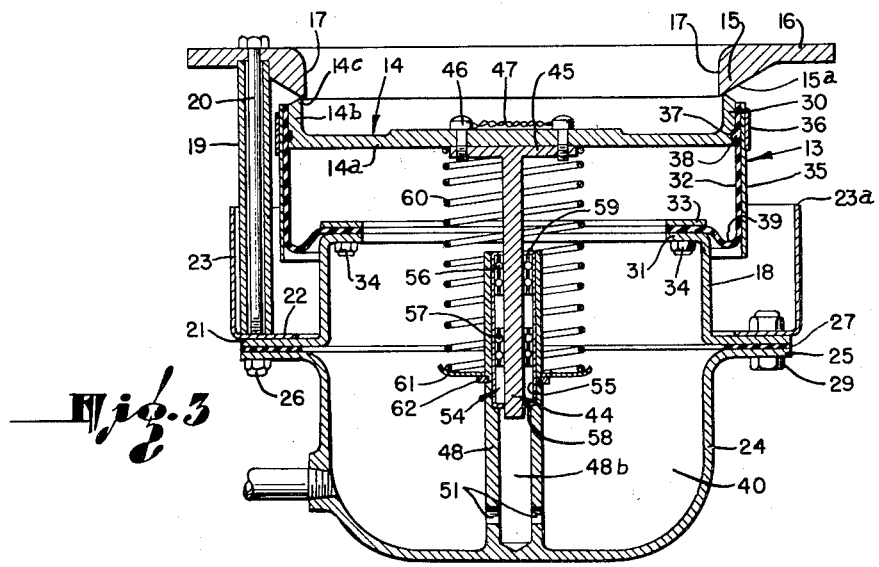
Fig. 3 is an enlarged sectional view of the cabin outlet flow control valve taken on the line 3—3 of Fig. 4.
Figure 4:
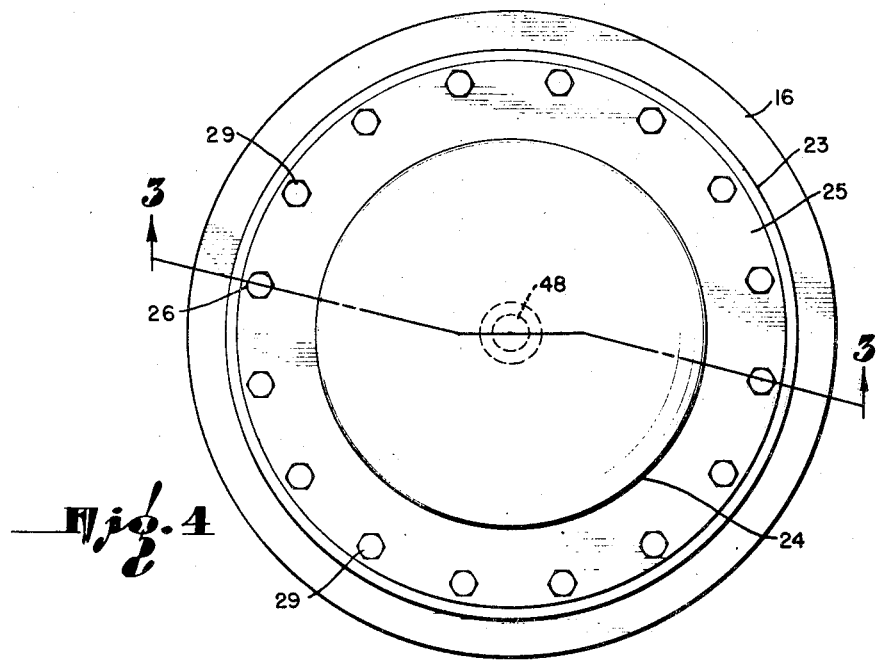
Fig. 4 is an end view of said valve.

The valve assembly 13 is best shown in Fig. 3, and comprises an outwardly opening valve member, indicated generally at 14, and includes a movable wall in the form of a cup-shaped valve having a body member 14a and an annular, axially extending wall 14b, and a free edge 14c which is engageable with a sloping seating surface 15a of a seat, indicated generally at 15, in the shape of a truncated cone. With this construction of valve member 14 there is no increase in the effective pressure area of said member as the valve opens.

The valve seat 15 is formed integrally with a base ring 16, which is attached to the cabin by any suitable means, such as bolts, not shown. The base ring and seat extend about the outer end of the opening 12 and are provided with a passage 17 therein, which registers with said opening 12. An annular member 18, generally Z-shaped, in cross section, is supported in spaced relationship to the ring 16 by means of spacer sleeves 19 disposed on bolts 20, which are annularly spaced apart.

The member 18 includes an outwardly extending annular flange 21 having holes therein for reception of the adjacent ends of the bolts 20, and interposed between the flange 21 and the sleeve 20 is an inturned flange 22 of an annular skirt 23, which extends from said flange 21 toward the base ring 16. The free end 23a of the skirt 23 is spaced from the base ring 16 to provide communication means for air flow through the valve assembly 13 when the valve 14 is open.

The device is provided with a generally cup-shaped cover 24 having an out-turned annular flange 25, which has annularly spaced openings therein for reception of the adjacent ends of the bolts 20, said ends being threaded and provided with nuts 26 thereon. As disclosed, a gasket 27 may be provided between the flanges 21 and 25 to thereby insure an air-tight seal between said flanges. Additional clamping or securing means are provided and comprise bolts 29, which are annularly spaced apart between the bolts 20.

Between the side wall 14b of the valve member 14a and an in-turned flange 31 of the member 18, is a flexible diaphragm 32 which is of generally cylindrical shape and unresponsive to ambient pressure. One end of the diaphragm 32 receives the flange-like wall 14b of the valve member 14 in a snug fit, and the opposite end of the diaphragm 32 is inturned and clamped to the flange 31 of the member 18 by means of an annular ring-like plate 33 on the side of the diaphragm opposite the flange 31, the parts being secured together by means of annularly spaced screws 34. The flange 31 of the member 18 is axially spaced from the valve member 14 to permit operative movement of said valve member.

About the cylindrical portion of the diaphragm 32 is disposed an annular collar 35, one end of which is secured to the valve member 14 and diaphragm by means of a press fitted ring or band 36, the other end being in radially spaced relation to the member 18. To provide additional securing means between the valve 14 and the diaphragm 32, the valve member is provided with an annular groove 37 in which an internal annular flange 38 of the diaphragm is received, thereby preventing axial slippage between the parts.

When the device is assembled the diaphragm 32 includes a generally U-shaped portion 39 in the space between the member 18 and the collar 35, the latter extending longitudinally beyond said U-shaped portion of the diaphragm. The valve member 14, diaphragm 32, member 18 and cover 24, define a pressure chamber 40, said chamber 40 being connected by a substantially unrestricted conduit 41 with a pressure chamber 42 defined by a housing 43 of a control or regulating unit, to be hereinafter described, the pressure within said chamber 42, conduit 41, and chamber 40 being the control pressure, and is of substantially the same value throughout these parts, said housing being connected to a source of pressure shown as a small, calibrated, restricted bleed connection 42a with the cabin, which provides a small flow of air between the cabin and said chamber 42.

The valve member 14 is movable axially and is provided with an axial stem 44 having a flange 45 secured to said valve member by means of screws 46. If desired, the screws may have drill holes in the heads for reception of a locking wire 47. The valve stem 44 has a portion of its free end disposed within the adjacent free end of a coaxial tubular sleeve or guide 48, which is shown as being integral with the cover 24 and which extends into the chamber 40, there being cross bores 51 in the sleeve 48, adjacent its fixed end, forming pressure relief passages for the interior bore 48b thereof.

The sleeve 48 has an enlarged bore adjacent the free end in which is received a ball bearing assembly, indicated generally at 54, and comprising a bearing housing 55 with ball and race assemblies 56 and 57 disposed therein. The ends of the housing 55 are inturned at 58 and 59, the end 58 resting against a shoulder at the inner end of the enlarged bore of the sleeve. The flanges 58 and 59 also form shoulders which maintain the ball and race assemblies in the housing, said ball and race assemblies being axially spaced apart within said housing to permit operative movements thereof. The stem 44 of the valve member 14 is received within the ball bearing assemblies which provide a substantially frictionless support for said stem, and which move axially within the housing 55 with axial movements of the valve stem 44.

The valve member 14 is urged in the closing direction by a relatively light spring 60, which reacts between said valve member and a spring retainer 61, operably secured on the sleeve 48 by means of a retaining ring 62, which is clipped into a groove provided therefor in said sleeve 48.

Referring again to Fig. 1, the control mechanism in the housing 43, which governs or regulates the control pressure in said housing, is shown as one arrangement of the invention, and it is to be understood that other arrangements can be used within the scope of the invention. This control mechanism, as shown, comprises isobaric control means, indicated generally at 65, which, as shown, comprises a bellows 66, pressure rate of change means, indicated generally at 67, and comprising a bellows 68, which may be a metallic spring bellows, as shown, with a predetermined inherent spring rate and deflection characteristic, or may be otherwise spring biased in both the collapsing and extending directions, as will be apparent to those skilled in the art, and differential pressure control means, indicated generally at 69, and which, as shown, comprises a bellows 70. The bellows 66, 68 and 70 are secured at one end to a fixed member, which, as shown, is the bottom wall 71 of the housing 43.

The bellows 66 is a pressure responsive device of known type and subjected to the absolute pressure within the housing 43. The bellows 66 has a stop 67a disposed within it, having one end fixed adjacent the fixed end of said bellows and having its free end located adjacent the movable end or wall 72 of the bellows, where it is adapted to be engaged by a plate 73, which forms part of a shaft or stem 74 extending axially from the free end 72 of said bellows 66.

Altitude preselecting means, indicated generally at 75, is provided and includes means for applying a variable yielding force tending to extend the bellows 66. This means comprises a spring 75a secured at one end to the free end of the stem 74, and secured at the other end to a threaded stem 76 of an altitude selector knob 77, said threaded stem 76 being adjustable in a nut 78 which is attached to the top wall 79 of the housing 43. Further details of the adjusting screw means 75 are shown in applicant's copending application for a Cabin Pressure Control System, Serial No. 613,794, filed August 31, 1945, now Patent No. 2,463,489.

Adjustable stop means is provided for limiting the extension of the bellows 66 and, as shown, comprises a bell crank 80 pivoted on a pin 81 in an ear 82, said ear being secured to the adjacent wall 83 of the housing 43. The pivotal pin 81 is adjacent the junction of a horizontal arm 84, and a substantially vertical arm 85 of the bell crank 80.

The free end of the arm 84 is bifurcated at 86 for reception of the stem 74, which has a pin 87 secured therein on the bellows side of the bifurcated end 86. The arm 85 has a recess 88 therein, for reception of one end of a spring 89 which reacts against the bottom of said recess and the adjacent wall 83 of the housing, to thereby urge the bell crank in a counter-clockwise direction. Counter-clockwise movement of the bell crank is limited by an adjusting screw 90 threaded in a boss 91 integral with the adjacent wall 92 of the housing. A lock nut 91a retains the screw 90 in adjusted positions.

The stem 74 of the bellows 66 is connected, by a link or beam 95, with an axial stem 96 of the bellows 68, said stem 96 being fixed to the movable end or wall 87 of said bellows. The stems 74 and 96 have pin and slot connections 98 and 99 with the respective ends of the beam 95, which is pivotally secured, intermediate said ends, to the stem 100, a movable valve member 101, by means of a pivot pin 102 located adjacent the lower end of said valve stem 100. Thus it will be apparent that the isobaric bellows 66 and the rate of change bellows are connected together in parallel for operation of the valve 101.

The valve 100 is slidable in a fixed guide 103 which may be secured to any suitable support, indicated generally at 104, said valve member 101 being tapered and adapted to cooperate with a valve seat 105 in the adjacent end of a conduit 106, which extends to the outside of the cabin, said conduit forming communication means between the chamber 42 of the control unit and ambient atmosphere.

The rate of change control means controls the rate of change of the pressure level in the chamber 42, and hence, in the cabin, and includes a conduit 108 connecting the interior of the bellows 68 with a tank or fluid reservoir 109, which has a conduit connection 110 with a chamber 111, which has a connection 112 with the chamber 42, so that the wall 97 of the bellows 68 moves in response to the differential of pressures on the exterior and interior respectively of said bellows.

Means for adjustably controlling the rate of change at a preselected rate includes the connection 112 having a short tubular member 113 with a valve seat 114 adjacent its free end which is engageable by a conical-shaped movable or adjustable valve member 115 for controlling the flow of fluid through said connection 112. The valve member 115 has a threaded stem 116 adjustably secured in a boss 117 integral with adjacent wall 118 of the chamber 111, said stem 116 having a knurled knob 119 thereon, to facilitate adjustment of the valve 115. The purpose of tank 109 is to provide a relatively large volume of air in the fluid circuit of the rate of change means so that the operative movements of the spring bellows 68 to either side of its free or balanced pressure position extend over a substantial period of time.

The differential pressure bellows 70 prevents the pressure in the chamber 42, and hence cabin pressure, from exceeding a predetermined maximum, said bellows having its interior connected to atmosphere by means of a conduit 120, so that it is responsive to the differential of pressure within the housing and atmosphere or ambient pressure. The bellows 70 has a movable end or wall 121 to which is attached to valve stem 122 of a conical, movable valve member 123, said stem being slidable in a guide 124 attached to any suitable supporting means, such as indicated generally at 125. The movable valve member 123 is adapted to cooperate with the seat 126 formed in the adjacent end of a conduit 127, which connects the chamber 42 with atmosphere.

The stem 122 is connected by a pin and slot connection 128, to an intermediate part of a lever 129 having one end pivotally secured on a pin 130 in an ear 131, secured to the wall 132 of the housing 43. The opposite end of the lever 129 is provided with a pin 133 to which one end of a spring 134 is secured, the opposite end of said spring being attached to a fixed member 135, which in turn is attached to the wall 79 of the housing.

*Operation*

Normally the pressure on the cabin side of the valve member 14, urging said valve in the opening direction, is balanced by the force of spring 60 and the air pressure in the chamber 40. The unbalancing of these forces will move the valve in the opening direction until the differential of pressures on opposite sides thereof will reach a balance or state of equilibrium. When said valve is in an open position and the pressure on the inner or cabin side is lower than that on the outer side, the valve will move in the closing direction until seated, or until a balance of pressures on the opposite sides thereof is reached.

It is to be understood that the supercharger 11 is operated continuously during a flight at a predetermined rate. This pressure tends to be reduced constantly due to leakage from the cabin and escape of air through the valve 13 which is at least slightly open when the supercharger is running. However, other factors being equal, the valve moves to a more nearly closed position as altitude is gained and the reverse is true as a plane descends. This is due to the fact that air leaks from the cabin faster as higher altitudes are attained, as the ambient pressure progressively decreases as altitude is gained. Also as altitude is gained the differential of cabin over atmospheric pressure increases for a given valve opening so that in order to maintain proper cabin pressure the valve must move in the closing direction with such gain in altitude.

Before a trip or flight begins, and while the aircraft is on the ground, the pressure in the control chamber 42 is at ambient atmospheric pressure, which also exists in the bellows 68 and the tank 109 due to their connection with the chamber 42 through the adjustable vent 112. The pressure in chamber 40 of the valve unit 13 will also be the same as that in the control chamber 42 due to its connection 41 therewith.

Assuming the flight is to be from a lower to a higher altitude, the tension of spring 75a is adjusted for the altitude of the destination airport. In this case the tension of said spring 75a is lessened so that the isobaric bellows 66 is permitted to collapse to the point where plate 73 engages the fixed stop 67a to limit said collapsing of said bellows. The valve 101 is then in an open position.

While the aircraft is on the ground, and with the supercharger 11 operating to provide ventilating flow, the valve member 14 remains in the open position because the pressure tends to build up within the cabin. This cabin pressure exerts a force on said valve greater than that exerted by spring 60 plus the pressure within the chamber 40, it being understood that the pressure differential required to open the valve is small due to its large area.

Besides adjusting the spring tension for the isobaric bellows, the rate valve 115 is also adjusted to the value computed for the rate of change for the estimated duration of the flight.

When the aircraft takes off and begins to gain altitude, ambient air pressure drops and air will escape from the control chamber 42 to atmosphere by way of the conduit 106, as the valve 101 is open. Thus the pressure in chamber 42 drops and along with it the pressure in chamber 40 drops.

Simultaneously, as the pressure in chamber 42 decreases the bellows 68 expands to effect closing of the valve 101. Air in the bellows 68 and tank 109 will also escape into said chamber 42 through the restricted valve controlled port 112, at a rate determined by the setting of the rate of change valve 115. As the air escapes from the bellows 68 and tank 109, said bellows gradually collapses over a predetermined period of time, and moves the valve 101 in the opening direction. The rate at which said air escapes from the bellows 68 and tank 109 into the chamber 42 is such that an equilibrium pressure is attained between the interior of said bellows and chamber 42 by or shortly before the time the plane reaches its destination airport, at which time the isobaric bellows will have expanded sufficiently to take over control of the valve 101, it being understood that at any time the pressure in the control chamber 42 reaches a value corresponding to the setting of the altitude selector 75, the isobaric bellows 66 takes over control to maintain a constant pressure in the chamber 42. That is, the isobaric bellows 66 expands as the pressure in the control chamber 42 is reduced, and through the link 95 effects closing movement of the valve 101, thereby limiting the pressure level in the control chamber 42 and chamber 40, and therefore in the airplane cabin, to a value predetermined by the setting of the altitude selector 75.

The differential control may be considered as a safety device for holding the cabin pressure at a safe differential relative to atmosphere at high altitudes and prevents bursting or rupturing of the cabin. With this in mind the differential pressure bellows 70 opens the differential control valve 123 at a predetermined safe pressure to protect the cabin structure. Because of the differential bellows, a set differential pressure between the cabin pressure and atmospheric pressure will not be exceeded.

In flying from a higher to a lower altitude, the altitude selector knob 76 is adjusted for the terminal airport and is moved in a direction to increase the force of spring 75 on the isobaric bellows 66, said bellows being expanded to a point whereat the pin 87 in the stem 74 engages the bifurcated end 86 of the lever 84 which limits the expansion of said bellows. This adjustment of the isobaric bellows effects closing of the valve 101 and during the flight from the higher to the lower altitude airport the action of the device is the reverse from that described in connection with a flight from a low altitude airport to a higher altitude airport.

From the foregoing it will be apparent that the isobaric bellows 66 is responsive to changes in the control pressure for limiting said control pressure and thus effecting the limiting of the cabin pressure level. Therefore, the rate of change bellows is sensitive to the control pressure for and controls the rate of change of said pressure, thus controlling the rate of change of cabin pressure; and the bellows 70 is controlled in accordance with the differential between the control pressure and atmospheric or ambient pressure.

It will be understood, of course, that the term "aircraft" as used herein, refers to any device adapted to pass through the earth's atmosphere.

I claim:

1. Mechanism for controlling the pressure in an enclosure, comprising: pressure control means operable to control the pressure in said enclosure, said pressure control means including a movable pressure sensitive element; walls defining a control pressure chamber; said movable pressure sensitive control element being exposed on one side to control chamber pressure and on the other side to enclosure pressure; means for regulating said control chamber pressure, including means subjected on one side to control chamber pressure and on the other side to a region of controlled pressure variable at a predetermined rate through a calibrated restricted bleed, for gradually varying said control chamber pressure over a predetermined period of time; and means for arresting control chamber pressure at a predetermined value.

2. Mechanism for controlling the pressure in an enclosure, comprising: pressure control means operable to control the pressure in said enclosure, said pressure control means including a movable pressure sensitive element; walls defining a control pressure chamber having an inlet passage and an outlet passage, said movable pressure sensitive control element being exposed on one side to control chamber pressure and on the other side to enclosure pressure; a fluid reservoir; means controlling the fluid flow between said reservoir and a region of pressure of a different value than that in said reservoir; and means for controlling one of the control chamber passages, said means being responsive to the differential of pressure between said control chamber and said reservoir for controlling the pressure in said control chamber.

3. Mechanism for controlling the pressure in an enclosure, comprising: pressure control means operable to control the pressure in said enclosure, said pressure control means including a movable pressure sensitive element; walls defining a control pressure chamber having an inlet passage and an outlet passage, one of said passages being restricted; said movable pressure sensitive control element being exposed on one side to control chamber pressure and adapted to be subjected on the other side to enclosure pressure; a pressure responsive device subjected on one side to control chamber pressure for controlling the unrestricted passage; a fluid reservoir having a connection with the other side of said pressure responsive device and having a connection with said control chamber; and means for controlling the last named connection for regulating the flow of fluid therethrough.

4. Mechanism for controlling the pressure in an enclosure, comprising: pressure control means operable to control the pressure in said enclosure, said pressure control means including a movable pressure sensitive element; walls defining a control pressure chamber having a restricted inlet and an outlet; said movable pressure sensitive control element being exposed on one side to control chamber pressure and on the other side to enclosure pressure; valve means for controlling the outlet of said control pressure chamber; pressure responsive means for controlling said valve means, said means being subjected on one side to control chamber pressure; a fluid reservoir having a connection with the other side of said pressure responsive means; means connecting the reservoir with the control chamber; and preselective valve means for controlling the last named connection for permitting a gradual passage of fluid between the reservoir and control chamber.

5. Mechanism for controlling the pressure in an enclosure, comprising: pressure control means operable to control the pressure in said enclosure, said pressure control means including a movable pressure sensitive element; walls defining a control pressure chamber having an inlet passage and an outlet passage; said movable pressure sensitive control element being exposed on one side to control chamber pressure and adapted to be exposed on the other side to enclosure pressure; means for controlling one of said passages for controlling the pressure in said control chamber, said means including means sensitive to the absolute pressure in the control chamber, and pressure responsive rate of pressure change means operable at a preselected rate subjected to control chamber pressure on one side and to a region of variable pressure on the other side, said region of variable pressure having a restricted connection with the control chamber, and adapted to override the absolute pressure sensitive means; and means for adjusting the response of said absolute pressure sensitive means.

6. Mechanism for controlling the pressure in an enclosure, comprising: pressure control means operable to control the pressure in said enclosure, said pressure control means including a movable pressure sensitive element; walls defining a control pressure chamber having an inlet passage and an outlet passage; said movable pressure sensitive control element being exposed on one side to control chamber pressure and on the other side to enclosure pressure; means for regulating said control chamber pressure and gradually varying same over a predetermined period of time, including means responsive to variations in the differential of pressure between control chamber pressure and a region of different pressure; control means for gradually varying the pressure of said region at a predetermined rate; means for arresting control chamber pressure at a predetermined value, said means including a movable wall and being absolutely responsive to the pressure in the control chamber; and means limiting the movement of the wall of the absolute pressure responsive means in at least one direction.

7. Mechanism for controlling the pressure in an enclosure, comprising: pressure control means operable to control the pressure in said enclosure, said pressure control means including a movable pressure sensitive element; walls defining a control pressure chamber having a restricted inlet and an outlet; said movable pressure sensitive control element being exposed on one side to control chamber pressure and on the other side to enclosure pressure; means for regulating said control pressure, including adjustable isobaric control means subjected to control chamber pressure and an adjustable rate of change means having one side subjected to control chamber pressure for controlling said outlet; a reservoir having a connection with the adjustable rate of change means for subjecting the opposite side of said means to reservoir pressure so that said rate of change means is operable in response to variations in the differential between control chamber pressure and the reservoir pressure; and a restricted connection between said reservoir and control chamber.

8. Mechanism for controlling the pressure in an enclosure, comprising: pressure control means operable to control the pressure in said enclosure, said pressure control means including a movable pressure sensitive control element; walls defining a control pressure chamber having a restricted inlet and an outlet, said movable pressure sensitive control element being exposed on one side to control chamber pressure and on the other side to enclosure pressure; a valve controlling said outlet; an absolute pressure responsive bellows within the control chamber, said bellows being connected to said valve; stop means within the bellows for limiting collapse thereof; adjustable stop means for limiting expansion of said bellows; yielding means for urging extension of said bellows; means for adjusting said yielding means; a rate of change bellows within the chamber and connected to said valve, said rate of change bellows having its exterior subjected to the pressure within said chamber; means, including a tank, connecting the interior of the last mentioned bellows with the interior of the chamber; and adjustable means for controlling the rate of pressure change within the bellows and tank.

9. Mechanism for controlling the pressure in an enclosure, comprising: pressure control means operable to control the pressure in said enclosure, said pressure control means including a movable pressure sensitive element; walls defining a control pressure chamber having a restricted inlet and an outlet; said movable pressure sensitive control element being exposed on one side to control chamber pressure and on the other side to enclosure pressure; valve means for controlling the outlet of said control pressure chamber; pressure responsive means for controlling said valve means, said means being subjected on one side to control chamber pressure; a fluid reservoir having a connection with the other side of said pressure responsive means; means connecting the reservoir with the control chamber; preselective valve means for controlling the last named connection for permitting a gradual passage of fluid between the reservoir and control chamber; a second outlet for said chamber; a valve for controlling said outlet; and differential pressure responsive means for controlling said valve, said differential pressure responsive means being adapted to be responsive to the differential of pressure between that in the control chamber and ambient pressure.

10. In a pressure control mechanism: walls defining a control pressure chamber having an inlet passage and an outlet passage; means for controlling the pressure in said control chamber comprising a differential pressure responsive device subjected on one side to pressure in said control chamber and adapted to control one of said passages; a relatively large capacity connection between the other side of said device and the control chamber; presettable restricted means for said connection with the control chamber; and an absolute pressure responsive device subjected to control chamber pressure adapted to cooperate with the differential pressure responsive device in controlling said one passage.

11. In an aircraft cabin pressure control mechanism having means for supplying air under pressure to the cabin, comprising: flow control means for directly controlling the cabin pressure including a valve subjected on one side to cabin pressure for urging said valve in the opening direction and means forming an enclosure whereby said valve is subjected on the other side to a fluid pressure in said enclosure; means for regulating said control pressure, including a control chamber having a restricted connection with the interior of the cabin, said control chamber having a connection with said enclosure and a pair of connections with atmosphere; adjustable isobaric means and adjustable rate of change means responsive to control chamber pressure for controlling one of said pair of connections; and differential pressure control means for controlling the other of said pair of connections, said means being responsive to the differential of pressure between that in said control chamber and ambient pressure.

12. The invention defined by claim 11, wherein said rate of change means includes a bellows within the housing; and there is a restricted connection, including a reservoir, between the interior of the bellows and the interior of the housing.

13. In an aircraft cabin pressure control system having means for supplying air under pressure to said cabin, comprising: flow control means for directly controlling the cabin pressure including a valve subjected on one side to cabin pressure for urging same in the opening direction, and means forming an enclosure for subjecting the other side of said valve to a fluid control pressure; means for regulating said control pressure including a control chamber having a restricted connection with the interior of the cabin, a connection with said enclosure, and a connection with atmosphere; a valve controlling said atmospheric connection; an absolute pressure responsive bellows within the chamber, said bellows being connected to the last named valve; stop means within the bellows for limiting collapsing thereof; adjustable stop means for limiting the expansion of said bellows; yielding means to urge extension of the bellows; means for adjusting said yielding means; a rate of change bellows within the chamber and connected to the second mentioned valve, said rate of change bellows having its exterior subjected to the pressure within said chamber; means, including a tank, connecting the interior of the last mentioned bellows with the interior of the chamber; and adjustable means for controlling the rate of pressure change within the bellows and tank.

14. The invention defined by claim 13, wherein there is a second connection between the chamber and atmosphere; a valve controlling said connection; a bellows within the chamber, connected to said valve and subjected on the outside to chamber pressure; and means connecting the interior of said bellows with the atmosphere.

15. Mechanism for controlling the pressure in an enclosure, comprising: pressure control means operable to control the pressure in said enclosure, said pressure control means including a movable pressure sensitive element; walls defining a control pressure chamber; said movable pressure sensitive control element being exposed on one side to control chamber pressure and on the other side to enclosure pressure; means for regulating said control chamber pressure, including means having a limited rate of movement and responsive to variations in the differential of pressure between that in the control chamber and a region of controlled pressure, for gradually varying said control chamber pressure over a predetermined period of time; adjustable means for controlling the rate of change of the pressure of said region; and means for arresting control chamber pressure at a predetermined value.

16. Mechanism for controlling the pressure in an enclosure, comprising: pressure control means operable to control the pressure in said enclosure, said pressure control means including a movable pressure sensitive element; walls defining a control pressure chamber having an inlet passage and an outlet passage; said movable pressure sensitive control element being exposed on one side to control chamber pressure and on the other side to enclosure pressure; and means for regulating said control chamber pressure to gradually vary same over a predetermined period of time, said means including means responsive to variations in the differential of pressure between that in the control chamber and a region of different pressure, and control means for gradually varying the pressure of said region at a predetermined rate.

17. Mechanism for controlling the pressure in an enclosure, comprising: pressure control means operable to control the pressure in said enclosure, said pressure control means including a movable pressure sensitive element; walls defining a control pressure chamber; said movable pressure sensitive control element being exposed on one side to control chamber pressure and on the other side to enclosure pressure; means for regulating said control chamber pressure, including a pressure responsive device having a movable wall operable at a controlled rate of response and responsive to variations in the differential of pressure between that in the control chamber and a region of controlled pressure, said region having a connection with the control chamber for gradually varying said control chamber pressure over a predetermined period of time; and means for arresting control chamber pressure at a predetermined value.

18. Mechanism for controlling the pressure in an enclosure, comprising: pressure control means operable to control the pressure in said enclosure, said pressure control means including a movable pressure sensitive element; walls defining a control pressure chamber; said movable pressure sensitive control element being exposed on one side to control chamber pressure and on the other side to enclosure pressure; and means for regulating said control chamber pressure, including means exposed on one side to pressure in the control chamber and on the other side to a region of controlled pressure having a restricted connection with the control chamber and operable independently of atmospheric pressure, for gradually varying said control chamber pressure over a predetermined period of time.

19. In a pressure control mechanism: walls defining a control pressure chamber having an inlet passage and an outlet passage; means for controlling the pressure in said control chamber comprising a differential pressure responsive device subjected on one side to pressure in said control chamber and adapted to control one of said passages; a connection between the other side of said device and the control chamber, said connection including a relatively large capacity portion interposed therein; means forming a restriction between said large capacity portion of the connection and the control chamber; and an absolute pressure responsive device subjected to control chamber pressure adapted to cooperate with the differential pressure responsive device in controlling said one passage.

20. In a pressure control mechanism: walls defining a control pressure chamber having an inlet passage and an outlet passage; means for controlling the pressure in said control chamber comprising a differential pressure responsive device subjected on one side to pressure in said control chamber and adapted to control one of said passages; a connection between the other side of said device and the control chamber, said connection having a relatively large capacity portion interposed therein; and means forming a restriction between said large capacity portion of the connection and the control chamber.

21. Mechanism for controlling the pressure in an enclosure, comprising: pressure control means operable to control the pressure in said enclosure, said pressure control means including a movable pressure sensitive element; walls defining a control pressure chamber; said movable pressure sensitive control element being exposed on one side to control chamber pressure and on the other side to enclosure pressure; means for gradually varying the control chamber pressure, including pressure responsive means responsive to the differential of pressure between that in the control chamber and a region of variable pressure; and means for controlling the rate of pressure change in said region.

22. In a pressure control mechanism: walls defining a control pressure chamber having an inlet passage and an outlet passage; means for directly controlling the pressure in said chamber including a differential pressure responsive device subjected on one side to pressure in said control chamber adapted to control one of said passages; a connection between the other side of said device and the control chamber, said connection having a relatively large capacity portion therein; and means forming a restriction between said large capacity portion of the connection and the control chamber.

JAMES M. KEMPER.

REFERENCES CITED

The following references are of record in the file of this patent:

UNITED STATES PATENTS

| Number | Name | Date |
|---|---|---|
| 2,393,343 | Schroeder | Jan. 22, 1946 |
| 2,396,116 | Noxon | Mar. 5, 1946 |
| 2,399,326 | Crot | Apr. 30, 1946 |
| 2,407,258 | Del Mar | Sept. 10, 1946 |
| 2,413,027 | Maxson | Dec. 24, 1946 |
| 2,424,491 | Morris | July 22, 1947 |
| 2,441,592 | Paget | May 18, 1948 |
| 2,463,487 | Widgery et al. | Mar. 1, 1949 |
| 2,463,489 | Kemper | Mar. 1, 1949 |
| 2,463,490 | Kemper | Mar. 1, 1949 |

FOREIGN PATENTS

| Number | Country | Date |
|---|---|---|
| 563,553 | Great Britain | Aug. 21, 1944 |